United States Patent [19]

Lynch et al.

[11] Patent Number: 4,701,949
[45] Date of Patent: Oct. 20, 1987

[54] FREQUENCY RESPONSIVE PARTY TELEPHONE LINE SELECTION APPARATUS AND METHOD

[75] Inventors: Daniel Lynch, Jackson; Steven B. Perry, Highlands, both of N.J.

[73] Assignee: Keptel, Inc., Tinton Falls, N.J.

[21] Appl. No.: 764,225

[22] Filed: Aug. 9, 1985

[51] Int. Cl.⁴ ............................................ H04M 13/00
[52] U.S. Cl. .................................... 379/179; 379/180; 379/181
[58] Field of Search .............. 179/17 R, 17 E, 84 SS, 179/84 T; 379/179, 180, 181, 177; 340/825.38, 825.39, 825.42, 825.43

[56] References Cited

U.S. PATENT DOCUMENTS

| | | | |
|---|---|---|---|
| 3,391,253 | 7/1968 | Grandmaison | 179/17 E |
| 3,626,106 | 12/1971 | Greening et al. | 179/84 SS |
| 4,048,448 | 9/1977 | Caniff et al. | 179/17 E |
| 4,154,987 | 5/1979 | Rosenberg et al. | 179/17 E |
| 4,567,330 | 1/1986 | Curtin | 179/17 E |
| 4,587,380 | 5/1986 | Curtin | 179/17 E |

Primary Examiner—James L. Dwyer
Attorney, Agent, or Firm—Kenyon & Kenyon

[57] ABSTRACT

An apparatus adapted to be coupled into a party telephone line for selecting a ringing signal transmitted on the line from among a plurality of possible coded ringing signals that could be transmitted on the line and for coupling the ringing signal to a telephone is disclosed. The apparatus comprises a rectifier coupled to the party line for providing a rectified ringing signal, a first switch having the rectified signal as an input for reversing the polarity of the rectified signal at selected times, a second switch coupled to the first switch for selecting either the rectified ringing signal or the ringing signal itself and a third switch coupled to the second switch for coupling the selected signal to a telephone coupled to the third switch. A control unit comprising a microprocessor is provided which evaluates the incoming ringing signal to determine its frequency and controls the first, second and third switches to route the ringing signal to the telephone if it is of the proper frequency after any necessary frequency conversion which is performed under control of the microprocessor. Frequency conversion is performed by appropriate control of the first switch coupled to the output of the rectifier.

19 Claims, 5 Drawing Figures

FREQUENCY RESPONSIVE PARTY TELEPHONE LINE SELECTION APPARATUS AND METHOD

BACKGROUND OF THE INVENTION

The present invention relates to telephone circuitry and in particular, to telephone circuitry for allowing the proper party on a party telephone line to receive an incoming message. In particular, the present invention relates to a party telephone line selection apparatus and method, which is responsive to the frequency of an incoming ringing signal to thereby determine if the incoming call is for a particular party of a group of party line users.

In party telephone lines, a number of parties share a common telephone line, for example, four. Various systems are in use for determining the party to which a call is directed. Due to the recent deregulation of the telephone industry, the older systems in which the ringer in each telephone was individually tuned to a specific frequency or was sensitive to ringing signals having a specific polarity, are no longer as useful, because individual customers may now purchase their own phones from other than their telephone company. Accordingly, an unmodified standard telephone which is purchased by a customer will not contain the proper circuitry for party line use. Therefore, it is necessary to provide special circuitry which can be connected into the telephone line itself for directing incoming calls to the proper party on a party line.

As indicated, in prior art systems using frequency responsive circuitry, a special circuit is installed in the individual telephone. Two common systems include the "deciharmonic" system, in which frequencies of 20, 30, 40, 50, 60, etc. Hz are transmitted along the party telephone line as the ringing signals. A special circuit tuned to the particular frequency may be located in the phone. In another system, called the "harmonic" system, frequencies of 16.67, 25, 33.33, 42, 54, 66.67, etc. Hz are utilized. Of course, additional frequencies can also be provided depending upon the number of party line users. In a typical application, four users are installed on a single party line. If a standard telephone is installed on a party line, the standard telephone will respond to most frequencies between about 16 and 33 Hz, and will not respond to frequencies above about 33 Hz. Accordingly, a standard telephone will either respond to all calls if the ringing signal is between 16 and 33 Hz, even if the calls are not directed to that party or will not respond to all calls if the ringing frequency is above 33 Hz, even if the calls are directed to that party.

SUMMARY OF THE INVENTION

Accordingly, it is an object of the present invention to provide a circuit which will select the proper incoming call and direct it to the proper party line user.

It is a further object of the present invention to provide a party line selection circuit which is responsive to the frequency of an incoming ringing signal to thereby direct an incoming call to the proper party.

It is still a further object of the present invention to provide a party line selection circuit which can be used with a standard unmodified telephone.

It is yet still a further object of the present invention to provide a microprocessor controlled party line selection circuit.

It is yet still another object of the present invention to provide a party line selection circuit which is relatively inexpensive and which utilizes a limited number of components.

These and other objects of the present invention are achieved, according to one aspect of the present invention, by an apparatus adapted to be coupled into a party telephone line for selecting a ringing signal transmitted on the line from among a plurality of possible coded ringing signals that could be transmitted on the line and for coupling the ringing signal to a telephone comprising means coupled to the party line for converting the frequency of a ringing signal on the line into a selected frequency range if the frequency is outside the selected range, thereby forming a converted ring signal, means coupled to the converting means and to the party line for selecting the ringing signal on the party line or the converted ringing signal, means coupled to the selecting means for coupling the selected signal to a telephone, and control means for determining the frequency of the ringing signal, the control means comprising means for enabling the means for coupling to connect the selected signal to the telephone if the ringing signal is of the proper frequency associated with the receiving party from among a plurality of frequencies, means for enabling the selecting means to select the converted signal if the ringing signal is not within a selected frequency range and the ringing signal if the ringing signal is within the selected frequency range, and means for enabling the means for converting to convert the frequency of the ringing signal into the selected frequency range if the ringing signal is not within the selected frequency range.

According to another aspect of the present invention these objects are achieved by an apparatus adapted to be coupled into a party telephone line for selecting a ringing signal transmitted on the line from among a plurality of possible coded ringing signals that could be transmitted on the line and for coupling the ringing signal to a telephone comprising first means coupled to the party line for converting a ringing signal on the line into a rectified signal, second means having the rectified signal as an input for reversing the polarity of the rectified signal at selected times in dependence on a first control signal, third means coupled to the second means and to the party line for selecting the ringing signal on the party line or the rectified signal from the second means in dependence on a second control signal, fourth means coupled to the third means for coupling the selected signal to a telephone in dependence on a third control signal, and control means for determining the frequency of the ringing signal, the control means comprising means for generating the third control signal if the ringing signal is of the proper frequency associated with the receiving party from among a plurality of frequencies, means for generating the second control signal to thereby allow the third means to select the rectified signal if the ringing signal is not within a selected frequency range and the ringing signal if the ringing signal is within the selected frequency range, and means for generating the first control signal to reverse the polarity of the rectified signal at selected times if the ringing signal is not within the selected frequency range.

Methods for selecting a ringing signal transmitted on a party telephone line out of a plurality of possible ringing signals that could be transmitted on the line are also within the scope of the invention.

Other objects, advantages, and features of the present invention will be apparent from the detailed description which follows.

BRIEF DESCRIPTION OF THE DRAWINGS

The present invention will be explained in greater detail in the following detailed description, with reference to the drawings, in which.

DETAILED DESCRIPTION

Figure 1:
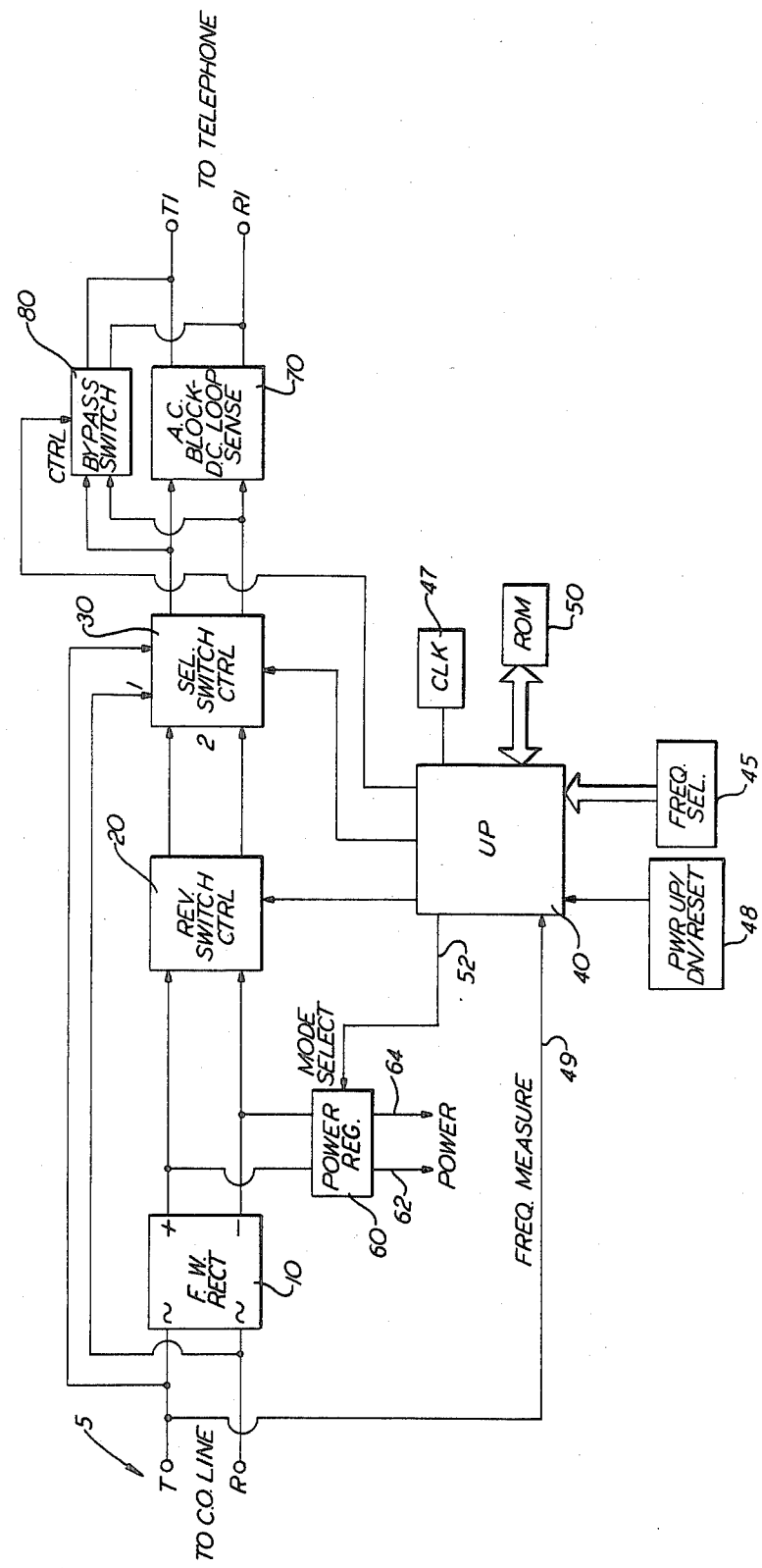
FIG. 1 is a block diagram of the system according to the present invention.

With reference now to the drawings, FIG. 1 is a block diagram of frequency responsive party line apparatus according to the present invention.

As shown in FIG. 1, the tip and ring conductors of an incoming party telephone line 5 are coupled to the input of a full wave rectifier bridge 10. The tip and ring conductors are also coupled to one input 1 of a selection switch 30, which may be a semiconductor device or an electromechanical switch. The output of full wave rectifier bridge 10 is coupled to a reversing switch 20, which is controlled so that the polarity of the output of the reversing switch is reversed at selected times. Reversing switch 20 also may be a semiconductor device or an electromechanical switch. The output of reversing switch 20 is coupled to another input 2 of selection switch 30. Selection switch 30 selects between input 1 which is coupled directly to the ring and tip telephone conductors and input 2, which is the output of the reversing switch. Both reversing switch 20 and selector switch 30 are controlled by a control circuit comprising a microprocessor 40, under program control. The microprocessor 40 may include an internal read only memory (ROM) or may be coupled to a an external ROM 50, which comprises a look-up table for a ring signal frequency determining program stored in main memory of microprocessor 40. A frequency selection switching circuit 45 is also coupled to the microprocessor 40, and the function of this circuit will be described hereinafter. Microprocessor 40 also includes other attached circuits, including a clock 47 and power up/down/reset circuit 48.

In addition, an output 52 may be provided from microprocessor 40 for selecting the mode of power supply regulator 60 coupled to the output of full wave rectifier bridge 10. In a first mode, wherein the microprocessor is inactive, and accordingly drawing only negligible current, the power supply regulator is in a low current mode. As soon as the microprocessor becomes active, however, the power supply regulator is driven into a higher current mode. Depending on the current supply limitations, such a dual mode power supply may not be necessary and a single mode power supply can be provided instead. The power supply regulator may also include two outputs 62 and 64. A first output 62 supplies power to the microprocessor and associated circuitry and may have the two modes described and a second output 64 preferably is provided for supplying power to the switching devices 20, 30 and 80, which in the preferred embodiment are electromechanical switches.

The output of selector switch 30 is coupled to a circuit 70, which comprises a circuit for blocking ringing current and for sensing d.c. loop current, i.e., when the handset of the telephone set is lifted off its cradle or goes off hook. This circuit is described in more detail with reference to FIG. 4. A third switching device 80, which comprises a bypass switch, is coupled across circuit 70, and like switching devices 20 and 30, is also controlled by microprocessor 40.

Figure 3:
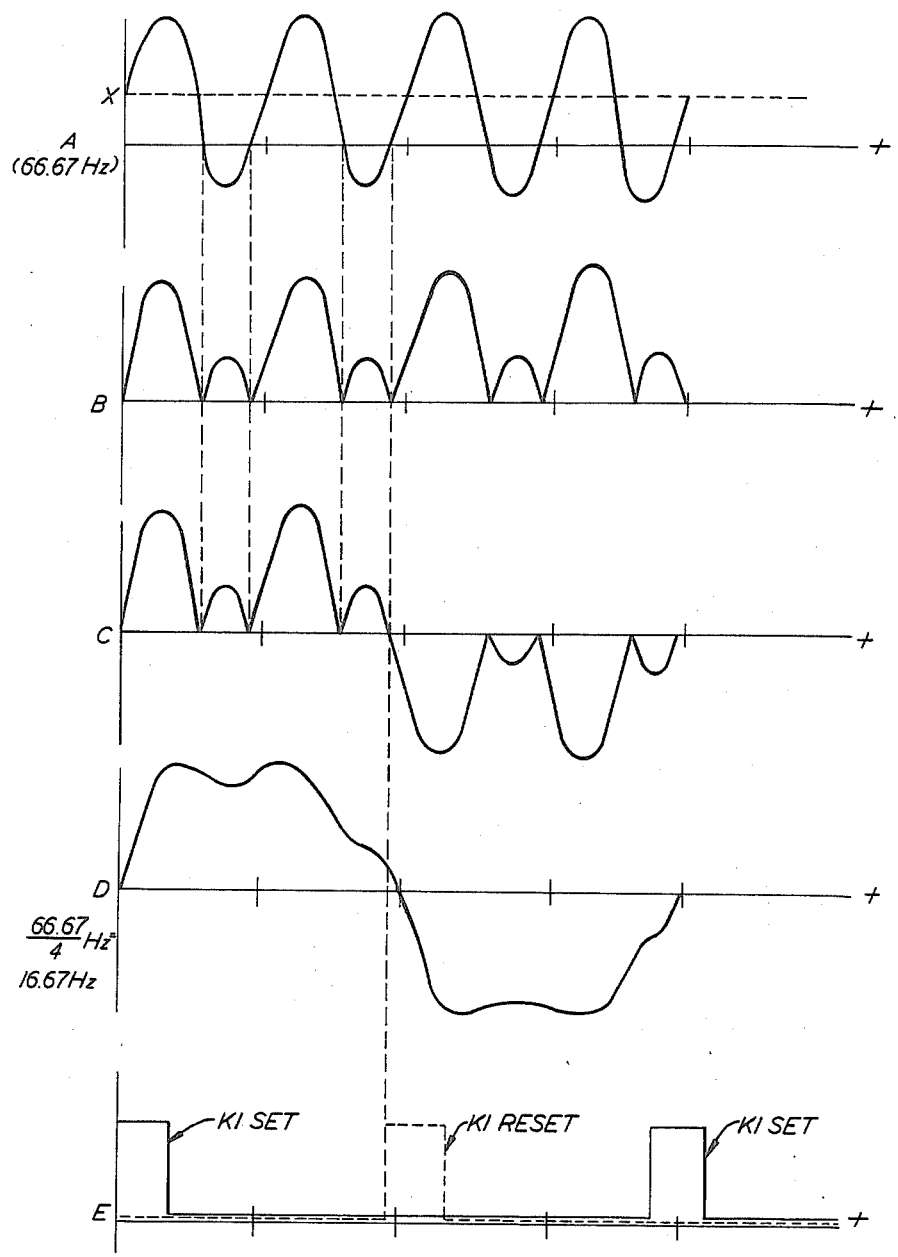
FIG. 3 is a graph of signals present in the system according to FIGS. 1 and 2 and which aids in an understanding of the operation of the present invention.

With reference now to FIG. 3, the operation of the circuit shown in FIG. 1 now will be explained. On a party telephone line, the various parties connected to the telephone line must be distinguished in order that a call be received by the proper party. As indicated, one method for insuring that the call is received by the proper party is to code the ringing signals such that they are only received by the party to whom the call is directed. One way of coding the ringing signals is by frequency. In the harmonic system, frequencies of 16.67, 25, 33.33, 42, 54, 66.67 Hz, etc., distinguish the various parties. Accordingly, the first party may be identified by a frequency of 16.67 Hz, a second party at 33.33 Hz, a third party at 42 Hz and a fourth party at 66.67 Hz. Standard telephone sets, however, are sensitive to ringing signals between 16 and 33 Hz, approximately. Accordingly, a standard telephone would be responsive to both ringing signals for party 1 and party 2 and would not be responsive to ringing signals for party 3 and party 4. Accordingly, the present invention provides means for distinguishing among various incoming ringing frequencies and for insuring that a particular party receives a ringing signal identifying a call which is directed to it. Thus, as shown in FIG. 3, assume, e.g., a signal of 66.67 Hz is transmitted from the central office along the party line. As an example, assume that this is the ringing signal which identifies calls for party 4 on the party line. If party 4 only has a standard telephone and he is not provided with apparatus according to the present invention, he will not hear the ringing signal, and thus will not receive his call. If a signal of 33Hz is transmitted on the party line, and this signal identifies party 2, for example, all the parties would hear a ringing signal, even though the incoming call is only directed to party 2.

To solve this problem, according to the present invention, the incoming ringing signal, shown in FIG. 3A, is rectified by full wave rectifier 10. Because generally d.c. level X exists on a telephone line, the output of the full wave rectifier 10 will appear as in FIG. 3B. Microprocessor 40 receives the ringing signal via input 49, and under program control, determines the period, and thus the frequency of the input ringing signal. Via a look-up procedure into ROM 50, microprocessor 40 then determines the proper divisor for dividing the incoming ringing signal so as to insure that the ringing signal is converted to a frequency between 16 and 33 Hz. In the instant example, a frequency of 66.67 Hz, shown in FIG. 3A, may be divided by 4 to provide a signal at 16.67 Hz, which is within the frequency range to which the ringer of a standard telephone is responsive. Accordingly, microprocessor 40 controls selector switch 30 so that selector switch 30 couples signals from the output of reversing switch 20 to a.c. blocking circuit 70. If the microprocessor had determined that the frequency of the incoming ringing signal was within the 16 to 33 Hz range to which the telephone set is responsive, then selector switch 30 would have been controlled so that the tip and ring signals are passed unrectified to a.c. blocking circuitry 70 via input 1 of selector switch 30. Microprocessor 40 also determines whether the incoming ringing signal is the ringing signal assigned to the particular party to which the circuitry of FIG. 1 is connected, and controls bypass switch 80 accordingly. Each party line user is provided with a circuit as shown in FIG. 1 coupled in the telephone line ahead of the telephone. In order to determine the frequency to which the circuit of FIG. 1 is responsive, a frequency selector circuit 45, which may comprise a series of switches and resistors, is provided. For example, a DIP switch switching bank can be provided for selecting the frequency to which the circuit of FIG. 1 is responsive, and thus identify the particular party on the party line. Assuming that the frequency selector switches are set to party 4, in the above example, wherein a ringing signal of 66.67 Hz is received, microprocessor 40 will generate a signal which controls bypass switch 80 such that bypass switch 80 couples its input to its output. This would allow the ringing signal thus to be connected to the telephone. If the frequency selector circuit was set to party 3, 2 or 1, microprocessor 40 would control switch 80 to keep switch 80 open, thus preventing the ringing signal from being received by the telephone.

As indicated, however, the frequency of the ringing signal may need to be changed so that it is within the range to which the telephone set is responsive. In order to accomplish this, microprocessor 40 determines the proper divisor from ROM look-up table 50. Assuming a 66.67 Hz input ringing frequency for party 4, and assuming the circuit of FIG. 1 is coded for party 4 by selector 45, microprocessor 40 will determine that the input ringing signal should be divided by 4, to result in a frequency of 16.67 Hz. In order to accomplish this division, the output of rectifier bridge 10 is alternately reversed by reversing switch 20. Accordingly, after every two full cycles of the input ringing signal shown in FIG. 3A, the output of rectifier bridge 10 is reversed by reversing switch 20. Thus, the positive and negative outputs of rectifier bridge 10 are reversed and are fed to selector switch 30 for two full additional cycles, as shown in FIG. 3C. After four full cycles, reversing switch 20 is switched back to its original position, and the output of rectifier bridge 10 is fed to selector switch 30 unchanged. At the end of six full cycles, reversing switch 20 again reverses the polarity of the signal fed to selector switch 30. This process continues until the party picks up the call or the caller, having not received an answer, hangs up. Accordingly, a frequency division by four function has been accomplished.

FIG. 3D illustrates the converted ringing signal appearing at the telephone, showing the natural filtering which may occur due to the telephone ringer circuitry.

Figure 2:
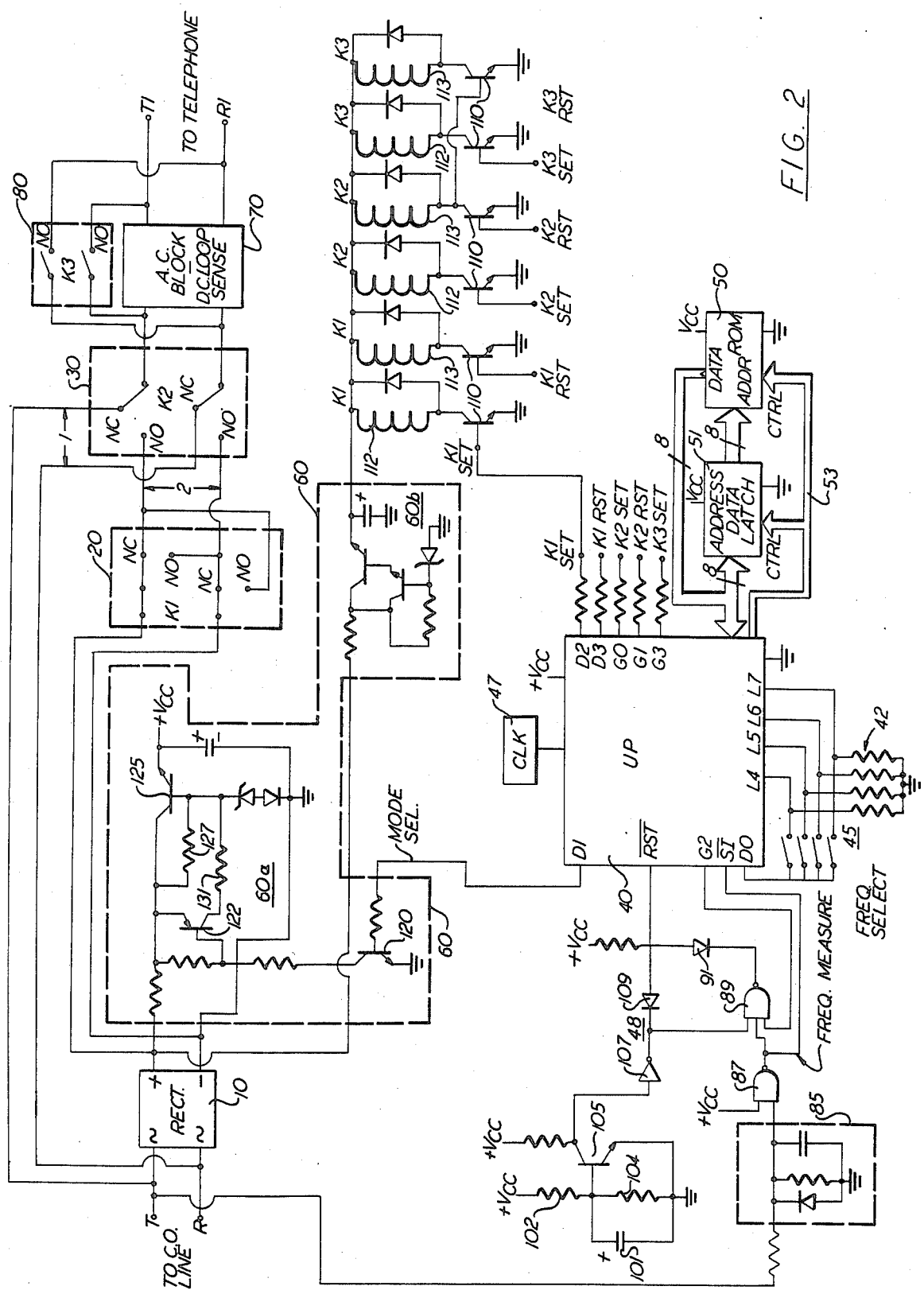
FIG. 2 is a more detailed schematic diagram of the system according to the present invention.

FIG. 2 shows details of the circuit of FIG. 1. Microprocessor 40 may comprise a type COP325C or COP404C microprocessor manufactured by National Semiconductor. The latter microprocessor is shown in FIG. 2, which microprocessor is used for prototyping purposes, and, accordingly, does not contain an internal ROM. The former microprocessor is more suitable for production purposes, as it contains an internal ROM and external latch 51 and ROM 50 accordingly would not be necessary. If the latter microprocessor is used, it is coupled to an address/data latch 51 which is coupled to ROM 50. Address/data latch 51 and ROM 50 are controlled by suitable control signals on control bus 53. A look-up table of divisors is stored in ROM 50, as explained heretofore.

Frequency select circuitry 45 comprises, in the illustrated embodiment, 4 DIP switches coupled to respective input lines L4, L5, L6 and L7 of the microprocessor 40. Accordingly, the switch which is turned on uniquely identifies the particular party coupled to the party line. Resistors 42 tie the respective lines to ground when the switches are in their open position.

Frequency measurement is performed by microprocessor 40 via input $\overline{SI}$ The ringing signal is coupled to one of the tip and ring lines via a clamping and filtering circuit 85. The output of the clamp/filter circuit 85 is coupled to a NAND gate 87, whose squared-up output is fed to the microprocessor for frequency measurement. The output of NAND gate 87 is also fed to one input of a three input NAND gate 89, whose output is coupled via a diode 91 to the reset input $\overline{RST}$ of the microprocessor.

A power up/power down/reset circuit 48 is also provided and is coupled to the reset input of microprocessor 40. Circuit 48 comprises a charging capacitor 101 and transistor 105. On power up, capacitor 101 takes a finite amount of time to charge up to the supply voltage via resistor 102. Until capacitor 101 has reached a threshold voltage, transistor 105 is maintained in an off condition. The output of inverter 107 is accordingly at a logic zero level. The output of inverter 107 is coupled to the reset input of microprocessor 40 via a diode 109, and accordingly, the reset input is held low, thus maintaining the microprocessor in a reset condition during power up. At the same time, the low logic level of inverter 107 is coupled to an input of triple NAND gate 89, thereby disabling NAND gate 89. As soon as capacitor 101 charges sufficiently, indicating sufficient operating power, transistor 105 turns on, the output of inverter 109 goes high, and assuming the output of gate 89 is not low, the reset condition is removed.

Output G2 of microprocessor 40 is also coupled as an input to NAND gate 89. The purpose of output G2 is as follows. Once a ringing signal is received by NAND gate 87, the squared-up ringing signal is coupled to NAND gate 89. Assuming at this point that sufficient operating power exists, the output of inverter 107 will be a logic 1 level. If the microprocessor is in an inactive or halt mode, output G2 will also be at a logic 1 level, thereby enabling NAND gate 89. Accordingly, any ringing signal present at the output of NAND gate 87 will be fed to the reset input of the microprocessor via diode 91, thereby resetting the microprocessor on the first ring. The purpose of output G2 is to enable NAND gate 89 so that an incoming ringing signal causes processor 40 to change state form a halt state to an active state so that it can process the ringing signal to determine its frequency. Once the microprocessor is reset, output G2 goes low, disabling NAND gate 89 and forcing its output high, thereby blocking further ringing signals until the frequency of the ringing signal is determined by processor 40. Since the output of inverter 107 is also high, the reset input of microprocessor 40 is disabled, and the microprocessor is ready for operation. The reset microprocessor 40 can now determine the frequency of the input ringing signal. If the input ringing signal is of the proper frequency as determined by the setting of switches 45, microprocessor 40 will determine whether the ringing signal must be divided down, and will issue the appropriate signals to reversing switch 20 and selector switch 30. Additionally, bypass switch 80 will be turned on, thereby allowing the ringing signal to reach the telephone. If the ringing signal need not be divided down, for example, it is within the range to which the telephone is responsive, and the ringing signal is the proper ringing signal for that party, switch 30 will be activated to position 1 and switch 80 will be turned on. If the signal must be divided down, switch 30 will be activated to position 2, switch 80 will be turned on and switch 20 will be controlled to alternately reverse the polarity of the rectified ringing signal, as described above with reference to FIG. 3. If the ringing signal is not the proper ringing signal for that party, then switch 80 will be maintained off.

If the frequency of the input ringing signal is determined to be incorrect, G2 will go high, thereby returning the processor to the halt mode and allowing the ringing signal to reset the microprocessor 40 via diode 91 for the next ring signal.

During power down, transistor 105 senses a level change at the voltage divider comprising resistors 102 and 104. This forces the output of the inverter 107 low, thus resetting the microprocessor.

Switches 20, 30 and 80 are controlled via output lines D2, D3, G0, G1 and G3 of microprocessor 40. These output lines are coupled to respective transistors 110 coupled to respective set and reset coils 112 and 113 of the switches 20, 30 and 80. In a preferred embodiment, switches 20, 30 and 80 are latching relays, so that once a switch is latched into a position, it need not draw any additional current. Accordingly, the set coils 112 for switches 20, 30 and 80 are pulsed to set the switch and likewise, coils 113 are pulsed to reset the switch. Once a switch is in a particular position, no additional current is drawn by the switch relay coil. The switches 20, 30 and 80 are shown in FIG. 2 in their reset position.

Although switches 20, 30 and 80 are shown in FIG. 2 as electromechanical relays, electronic switching means, such as semiconductor devices, could equally be utilized. The inventors have found, however, that electromechanical latching relays provide a very practical and simple implementation, because the frequency of operation of the switches is very low and they draw little current. For example, once a ringing signal is received, switches 30 and 80 need only be switched once, and switch 20, if division of the ringing signal frequency is required, is only switched at a very low frequency. For example, if the maximum ringing signal frequency is 66.67 Hz, switch 20 is switched between positions 1 and 2 at a rate of 33.33 Hz, as shown in FIG. 3, or stated another way, the switching frequency is only 16.67 Hz. The set and reset signals for switch 20 are shown in FIG. 3E. As shown, the set and reset signals are pulses, preferably having a duration of only 5 msecs.

Microprocessor 40 also may be provided with an output D1, which selects the mode of power supply regulator 60. Power supply regulator 60 comprises a first portion 60a and a second portion 60b. Portion 60a provides power supply voltage to the electronic components such as the microprocessor 40, address data latch 51 and ROM 50. In the absence of a ringing signal at input $\overline{SI}$ of microprocessor 40, the microprocessor remains in a halt state. As soon as a ringing signal is detected, microprocessor 50 changes from a halt state to an active state. The reason for this is that in the halt state, microprocessor 40 will draw very low current, on the order of approximately 50 microamperes and in an active state, the microprocessor will draw approximately 500 microamperes. Since it is important that the device, which is powered from the telephone line itself, not present a high impedance to the telephone line and therefore draw little current, it is preferable to have the microprocessor change state to an active state only when needed, i.e., when it must perform a computation such as determining the frequency of the incoming ringing signal. Accordingly, during a halt state, transistor 120 is maintained in an off condition by a logic zero level at output D1 of microprocessor 40. Accordingly, transistor 122 is also maintained in an off condition, and series pass transistor 125, which performs a regulating function, is controlled via a relatively large bias resistor 127, for example, approximately 330K ohms. Once microprocessor 40 goes to an active state, and requires more power, transistor 120 is turned on by a high logic level at output D1. This in turn turns transistor 122 on, which in turn places another resistor 131 having a lower resistance, for example, 10K ohms, in parallel with resistor 127, thereby allowing transistor 125 to be driven to conduct more heavily.

Power supply regulator 60 also includes an additional section 60b, which supplies power to energize relay coils 112 and 113 of switches 20, 30 and 80. As indicated above, switches 20, 30 and 80 are of the latching type, so that the relay coils 112 and 113 need only be pulsed to set or reset the particular switch. In the preferred emobodiment, the relay coils 112 and 113 are pulsed for approximately 5 milliseconds. This also allows the apparatus to draw negligible current from the telephone lines. Diodes are provided across the relay coils for transient suppression.

Once a party picks up the telephone handset in resposne to a ringing signal, the microprocessor 40 senses that the ringing signal has closed. At this point, all switches 20, 30 and 80 are returned to their reset condition. Voice signals, accordingly, pass through circuit 70 and the normally closed contacts of switch 30. When a ringing signal closes because the party has not picked up the telephone handset and the caller has hung up, the switches 20, 30 and 80 also are reset.

Figure 4:
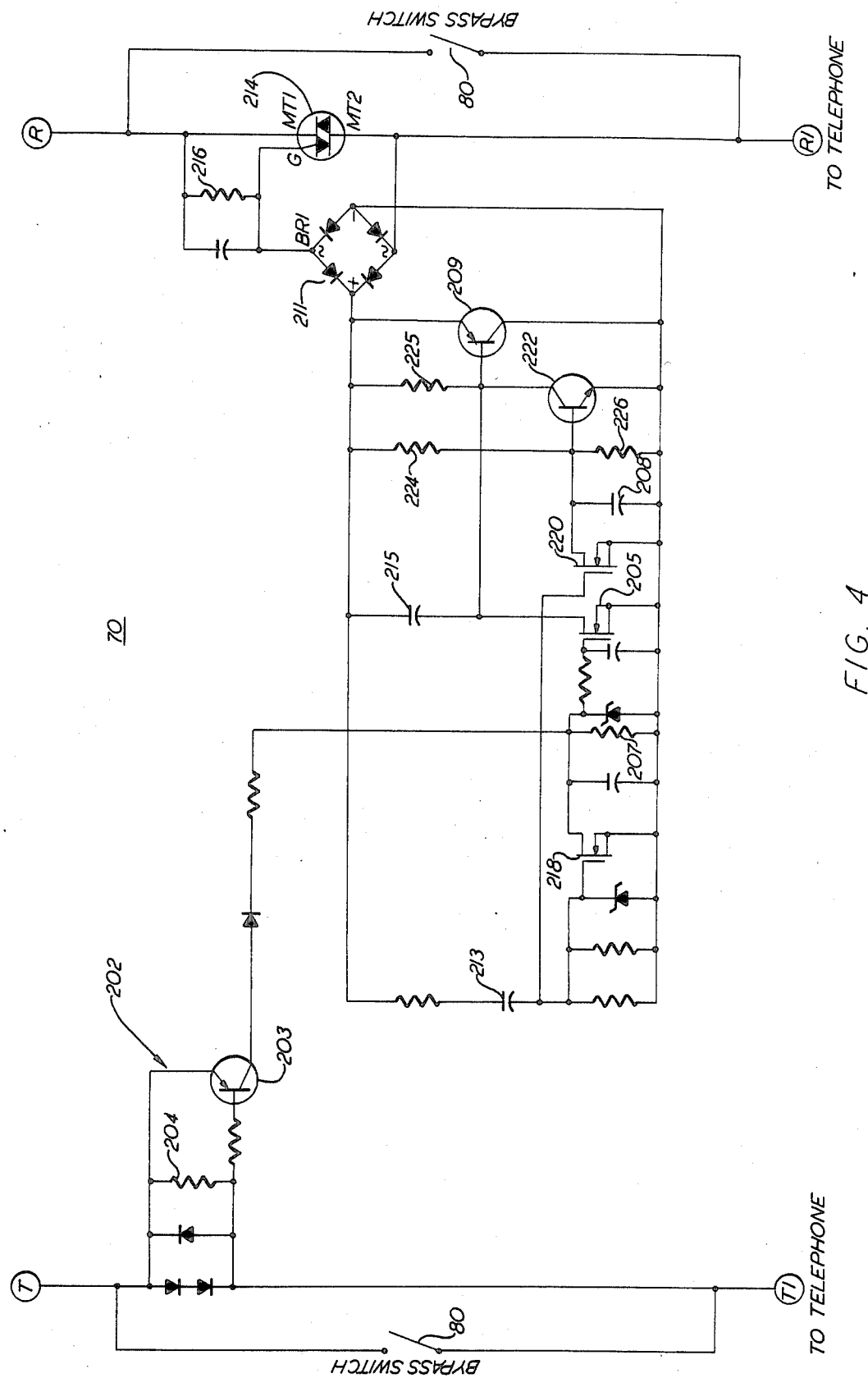
FIG. 4 is a diagram of one part of the circuit of FIGS. 1 and 2.

FIG. 4 shows component 70 shown in FIGS. 1 and 2. The purpose of component 70 is, as explained before, to block a.c. ringing signals and to sense when the handset of the telephone receiver has been lifted. In FIG. 4, the two switch sections of bypass switch 80 are shown coupled across the respective tip and ring lines. When the handset of the telephone is lifted, a small curent flows through a semiconductor switching device which may be provided in the ring line, preferably a triac 214. If a triac is used, a small current flows through the triac between the MT1 and gate terminals when the handset is lifted. Current flows through bridge rectifier 211, through resistor 225, transistor 222, back through bridge rectifier 211, through the telephone and through resistor 204. Transistor 222 is maintained on by a voltage divider comprising resistors 224 and 226. When the handset is lifted, a pulse is coupled through capacitor 213 to transistors 218 and 220. Transistors 218 and 220 preferably are field effect transistors. Transistors 218 and 220 accordingly, are turned on momentarily by this pulse. Transistor 222 is turned off by transistor 220 and transistor 209 is set to go into heavy conduction once transistor 205 is turned on.

Transistor 205 is forced into heavy conduction by a d.c. current sensing circuit 202 which may be provided in the tip line. As explained, once the handset is lifted, current flows in the ring and tip lines. A current flowing through resistor 204 is sensed by transistor 203. Transistor 203 thus is turned on due to this current flowing in resistor 204. Conduction of transistor 203 turns on transistor 205, which also may be a field effect transistor, due to the current flowing in resistor 207. Transistor 205, in turn, forces the base of transistor 209 low, turning transistor 209 fully on. When transistor 209 is on, current can flow through the transistor 209 from bridge circuit 211. When the handset is lifted and transistor 209 turned on, d.c. current thus passes through bridge rectifier 211 and through transistor 209. When the current flowing in the ring and tip lines and between terminal MTI and the gate of triac 214 reaches a sufficient level, triac 214 will go into full conduction, thus completing a low resistance path through the main terminals of the triac for both the d.c. loop current and for voice signals. Resistor 216 is provided for passing a portion of the triac gate current In the absence of the lifting of the handset of the telephone, no d.c. loop current will flow. Accordingly, transistor 209 will be maintained off, and no current will flow through bridge rectifier 211. Accordingly, triac 214 will be turned off and no signals on the ring and tip lines, for example, such as ringing signals, can be received by the telephone in the absence of bypass switches 80 being turned on. The disabling of transistor 209 during ringing is insured by transistors 218, 220 and 222. When a ringing signal appears on the ring and tip conductors, it is passed by bridge rectifier 211 and capacitor 213 to the gates of transistors 218 and 220. Transistors 218 and 220 are thus turned on by the ringing signal, therefore holding the gate of transistor 205 low and the base of transistor 222 low. By holding the gate of transistor 205 low, transistor 209 is prevented from being turned on, thus preventing triac 214 from turning on. At the same time, transistor 220 is turned on by a received ringing signal, which holds the base of transistor 222 low. Transistor 222 is thus in a nonconducting state when a ringing signal is being received. Accordingly, transistor 209 cannot be turned on during the receipt of a ringing signal. Should the telephone handset be lifted, however, after the ringing signal terminates, transistor 209 will be turned on as indicated above, thereby turning on the triac 214.

Figure 5:
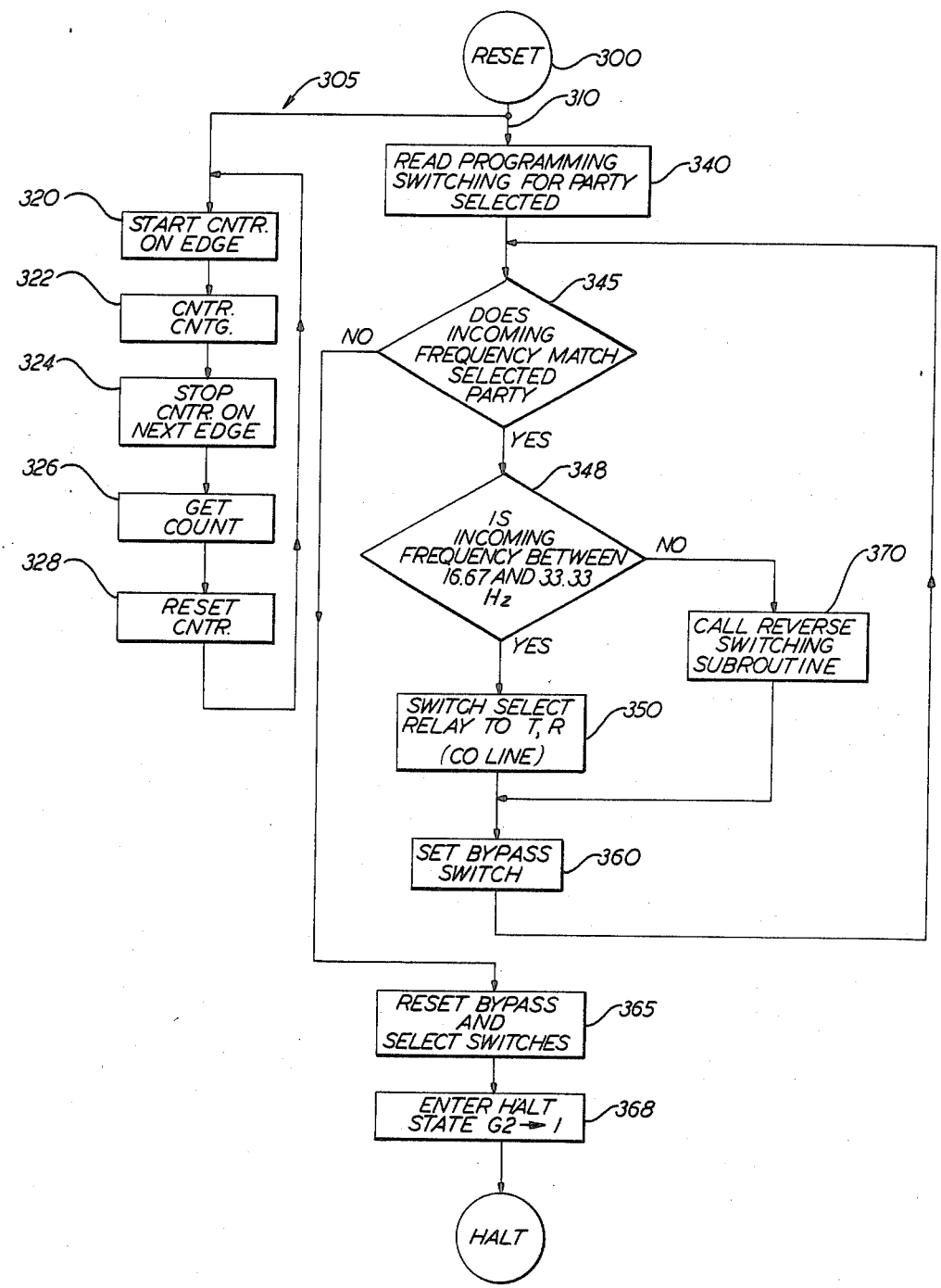
FIG. 5 is a flowchart of the operation of the program stored in the microprocessor memory.

FIG. 5 shows the flowchart for the operation of a program stored in memory of microprocessor 40. As indicated in FIG. 5, after a reset 300, the program enters two legs, a first leg 305 and a second leg 310. In the first leg 305, a counter is started upon the receipt of an edge of the squared up ringing signal at input $\overline{SI}$ of microprocessor 40. This is shown by block 320. Between the receipt of the first edge and the receipt of a second edge, the counter continues to count, as shown by block 322. Upon receipt of the next edge, the counter is stopped, as shown by block 324. The time between two edges of the squared-up ringing signal determines the period of the ringing signal and thus the frequency. At this point in time, the main program obtains the count as shown by block 326, and the counter is reset at 328. The count is inversely proportional to the frequency. As shown, leg 305 of the program runs continuously so that the microprocessor, when in an active state, is continuously determining the frequency of any incoming ringing signal at input $\overline{SI}$.

In leg 310, microprocessor 40 determines, from switches 45, the frequency of the particular party. This is shown by block 340. At step 345, microprocessor 40 determines whether the incoming frequency as determined by the count obtained at step 326, which count is inversely proportional to the frequency, matches the frequency of the selected party. If it does, a determination is made at step 348 whether the incoming frequency is in the selected range between approximately 16 and 33 Hz. If it is, selector switch 30 is positioned so that signals received directly from the CO line from input 1 are routed to bypass switch 80. This is shown at step 350. At step 360, bypass switch 80 is set to allow the ringing signal to be received by the telephone. The program then returns to step 345 to match the next ringing signal with the selected party.

If, at step 345 it is determined that the incoming frequency does not match the selected party, then bypass switch 80 and select switch 30 are reset into the position shown in FIG. 2. This is indicated by step 365. At step 368, microprocessor 40 returns to a halt state and output G2 goes high, thereby enabling NAND gate 89 to pass the next ringing signal.

If at step 348, it is determined that the incoming frequency is not between 16 and 33 Hz, then a reverse switching subroutine 370 is entered, in which microprocessor 40 determines which divisor from the look-up table in ROM 50 should be used to divide the frequency down so that it is within the 16 to 33 Hz range.

In the foregoing specification, the invention has been described with reference to a specific exemplary embodiment thereof. It will, however, be evident that various modification and changes may be made thereunto without departing from the broader spirit and scope of the invention as set forth in the appended claims. The specification and drawings are accordingly, to be regarded as illustrative rather than in a restrictive sense.

What is claimed is:

1. Apparatus adapted to be coupled into a party telephone line for selecting a ringing signal transmitted on the line from among a plurality of possible coded ringing signals that could be transmitted on the line and for coupling the ringing signal to a telephone comprising:

first means coupled to the party line for converting a ringing signal on the line into a rectified signal;

second means having said rectified signal as an input for reversing the polarity of said rectified signal at selected times in dependence on a first control signal;

third means coupled to said second means and to said party line for selecting said ringing signal on said party line or said rectified signal from said second means in dependence on a second control signal;

fourth means coupled to said third means for coupling said selected signal to a telephone in dependence on a third control signal; and control means for determining the frequency of said ringing signal, said control means comprising means for generating said third control signal if said ringing signal is of the proper frequency associated with the receiving party from among a plurality of frequencies, means for generating said second control signal to thereby allow said third means to select said rectified signal if said ringing signal is not within a selected frequency range and said ringing signal if said ringing signal is within said selected frequency range, and means for generating said first control signal to reverse the polarity of said rectified signal at selected times if said ringing signal is not within said selected frequency range.

2. The apparatus recited in claim 1, wherein said second means comprises reversing switch means.

3. The apparatus recited in claim 2 wherein said second, third and fourth means comprise electromechanical switch means.

4. The apparatus recited in claim 3, wherein said electromechanical switch means comprise latching relay means.

5. The apparatus recited in claim 1 wherein said control means comprises microprocessor means.

6. The apparatus recited in claim 5, further comprising power supply regulator means receiving power from said party telephone line for powering said apparatus.

7. The apparatus recited in claim 6, wherein said power supply regulator means comprises means for supplying a low current to said apparatus if said microprocessor is in an idle state, and means responsive to a change of state of said microprocessor from said idle state to an active state to allow said regulator means to supply a higher current.

8. The apparatus recited in claim 1, further comprising means for blocking said ringing signals and for sensing when said telephone goes off hook coupled between said third means and said telephone and in parallel with said fourth means.

9. The apparatus recited in claim 5, further comprising read only memory means coupled to said microprocessor means, said read only memory means comprising a look-up table of divisors for said microprocessor means, whereby if said ringing signal is not within said selected frequency range but is of the proper frequency associated with the receiving party, said microprocessor means will generate said first control signal at said selected times determined by said divisor to thereby reverse the polarity of said rectified signal at said selected times.

10. The apparatus recited in claim 5, wherein said microprocessor means includes switch means for selecting one ringing signal frequency from among a plurality of frequencies, said one frequency uniquely identifying the receiving party.

11. The apparatus recited in claim 5, further comprising means for resetting said microprocessor means as soon as a ringing signal is received.

12. The apparatus recited in claim 5, further comprising means for resetting said second, third and fourth means to a preset state when said ringing signal terminates.

13. A method for selecting a ringing signal transmitted on a party telephone line from among a plurality of possible coded ringing signals that could be transmitted on the line and for coupling the ringing signal to a telephone comprising the steps of:
converting a ringing signal on the line into a rectified signal;
reversing the polarity of said rectified signal at selected times in dependence on a first control signal;
selecting said ringing signal on said party line or said rectified signal in dependence on a second control signal;
coupling said selected signal to a telephone in dependence on a third control signal; and
determining the frequency of said ringing signal, said step of determining comprising generating said third control signal if said ringing signal is of the proper frequency associated with the receiving party from among a plurality of frequencies, generating said second control signal to thereby allow the selection of said rectified signal if said ringing signal is not within a selected frequency range and said ringing signal if said ringing signal is within said selected frequency range, and generating said first control signal to reverse the polarity of said rectified signal at selected times if said ringing signal is not within said selected frequency range.

14. The method recited in claim 13, wherein said step of determining comprises obtaining a divisor from a look-up table of divisors, whereby if said ringing signal is not within said selected range but is of the proper frequency associated with the receiving party, said first control signal is generated at said selected times determined by said divisor to thereby reverse the polarity of said rectified signal at said selected times.

15. The method recited in claim 13, further comprising the step of placing said first, second and third control signals in a preset state when said ringing signal terminates.

16. Apparatus adapted to be coupled into a party telephone line for selecting a ringing signal transmitted on the line from among a plurality of possible coded ringing signals that could be transmitted on the line and for coupling the ringing signal to a telephone comprising:
means coupled to the party line for converting the frequency of a ringing signal on the line into a selected frequency range if the frequency is outside the selected range, thereby forming a converted ringing signal;
means coupled to said converting means and to said party line for selecting said ringing signal on said party line or said converted ringing signal;
means coupled to said selecting means for coupling said selected signal to a telephone; and
control means for determining the frequency of said ringing signal, said control means comprising means for enabling said means for coupling to connect said selected signal to the telephone if said ringing signal is of the proper frequency associated with the receiving party from among a plurality of frequencies, means for enabling said selecting means to select said converted signal if said ringing signal is not within a selected frequency range and said ringing signal if said ringing signal is within said selected frequency range, and means for enabling said means for converting to convert the frequency of said ringing signal into said selected frequency range if said ringing signal is not within said selected frequency range.

17. The apparatus recited in claim 16 wherein said means for converting comprises first means for converting a ringing signal into a rectified signal and second means having said rectified signal as an input for reversing the polarity of said rectified signal at selected times.

18. A method for selecting a ringing signal transmitted on a party telephone line from among a plurality of possible coded ringing signals that could be transmitted on the line and for coupling the ringing signal to a receiving party comprising the steps of:
determining the frequency of an input ringing signal and if said ringing signal is of the proper frequency associated with the receiving party telephone from among a plurality of frequencies;
converting the frequency of the ringing signal on the line into a selected frequency range if the frequency is determined to be outside the selected range, thereby forming a converted ringing signal;

selecting said converted ringing signal if said ringing signal is not within the selected frequency range and said ringing signal if said ringing signal is within said selected frequency range; and coupling said selected signal to the receiving party telephone if said ringing signal is of the proper frequency associated with the receiving party telephone from among said plurality of frequencies.

19. The method recited in claim 18 wherein said step of converting comprises rectifying said ringing signal to form a rectified signal and reversing the polarity of said rectified signal at selected times.

* * * * *